United States Patent [19]

Kratschmer

[11] Patent Number: 4,461,946
[45] Date of Patent: Jul. 24, 1984

[54] APPARATUS FOR CLAMPING AN ASSEMBLY OF PARTS FOR LASER WELDING

[75] Inventor: Eric L. Kratschmer, Doylestown, Pa.

[73] Assignee: Hull Corporation, Hatboro, Pa.

[21] Appl. No.: 355,201

[22] Filed: Mar. 11, 1982

[51] Int. Cl.³ .............................................. B23K 27/00
[52] U.S. Cl. ...................... 219/121 LC; 219/121 LY; 228/183; 269/138; 269/236
[58] Field of Search ................ 219/121 LC, 121 LD, 219/121 LY, 121 EC, 121 ED, 121 EX; 269/229, 236, 134, 138; 228/183

[56] References Cited

U.S. PATENT DOCUMENTS

| | | | |
|---|---|---|---|
| 2,436,941 | 3/1948 | Sendoykas | 269/134 X |
| 2,692,520 | 10/1954 | Hayes | 269/236 X |
| 2,781,803 | 2/1957 | Nelson | 269/236 X |
| 3,497,203 | 2/1970 | Krug et al. | 269/236 |
| 3,987,527 | 10/1976 | Meadows | 269/236 |
| 4,152,573 | 5/1979 | Saurin et al. | 219/121 LY X |
| 4,223,201 | 9/1980 | Peters et al. | 219/161 X |
| 4,328,410 | 5/1982 | Slivinsky et al. | 219/121 LY X |
| 4,358,658 | 11/1982 | Van Blarigan et al. | 219/121 LC |

Primary Examiner—C. L. Albritton
Attorney, Agent, or Firm—Oliver D. Olson

[57] ABSTRACT

An assembly of top and bottom plates spaced apart vertically by peripheral and intermediate spacer bars forming a shelf of freeze drying or other processing equipment, is held together on a movable base support by peripheral clamps mounted removably at selected positions on the base support. A hollow framework carriage is mounted on the base support for movement above and relative to the shelf assembly and it supports a pair of elongated, laterally spaced clamp bars for retractable movement toward and away from the base support for releasably clamping therebetween interposed portions of the shelf assembly. A laser welder then is moved relative to the clamp assembly to weld the components together in the clamped areas. Upon completion of the welding operation, the clamp bars are retracted and the framework moved over the base support and assembly to the area next to be welded, whereupon the clamp bars are extended into clamping position and the welding operation is repeated.

11 Claims, 11 Drawing Figures

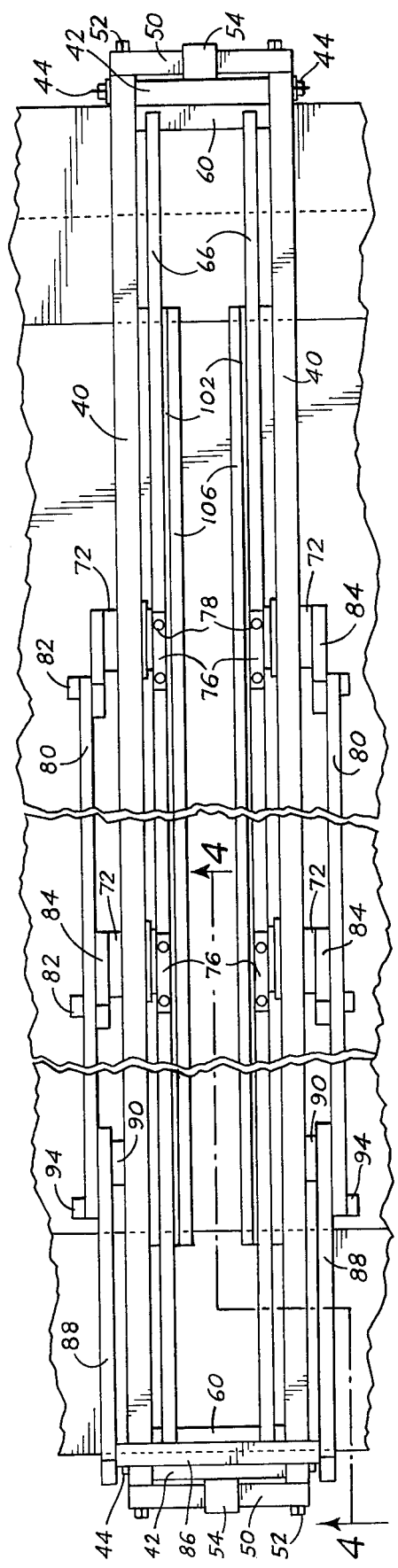

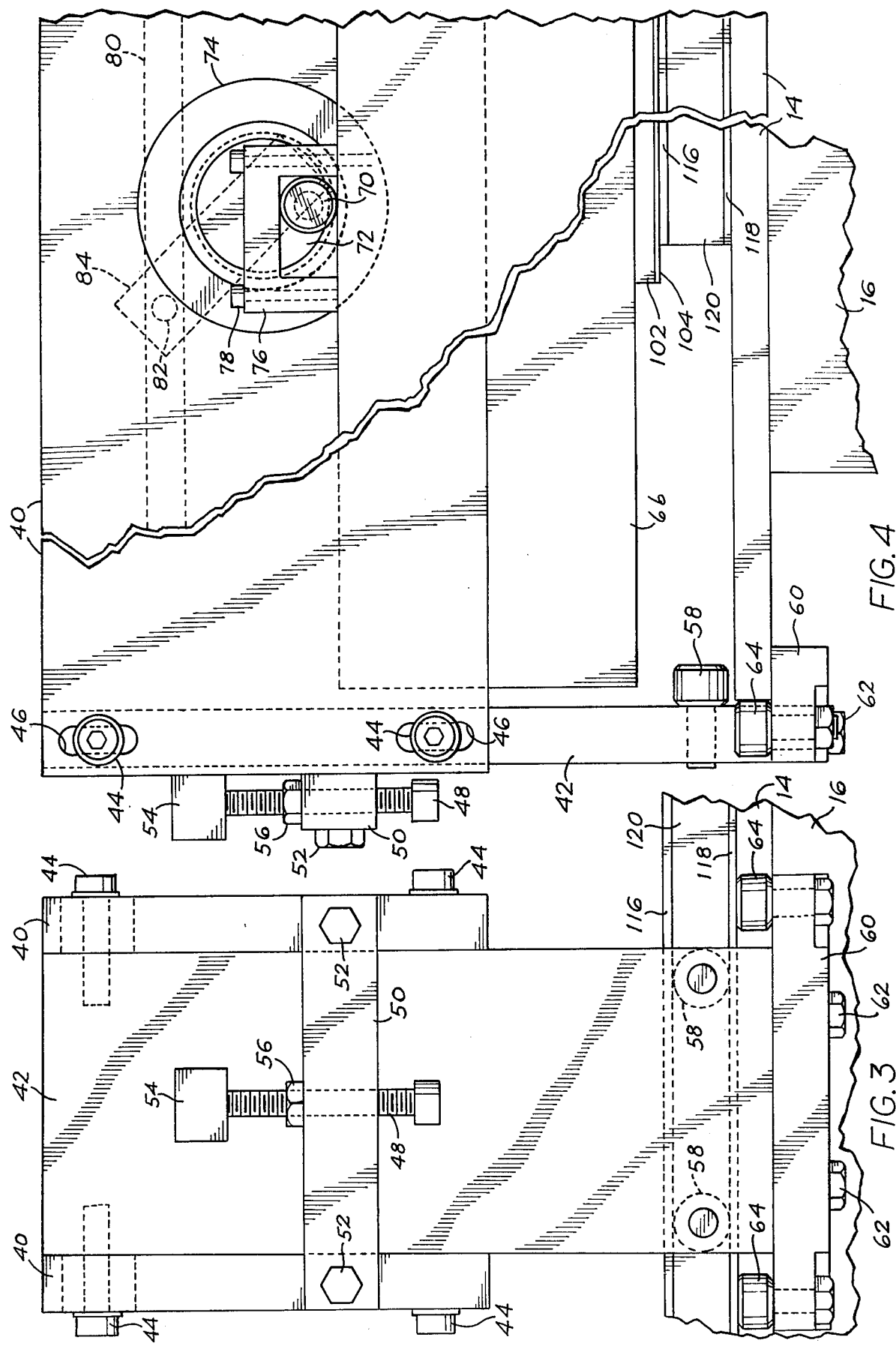

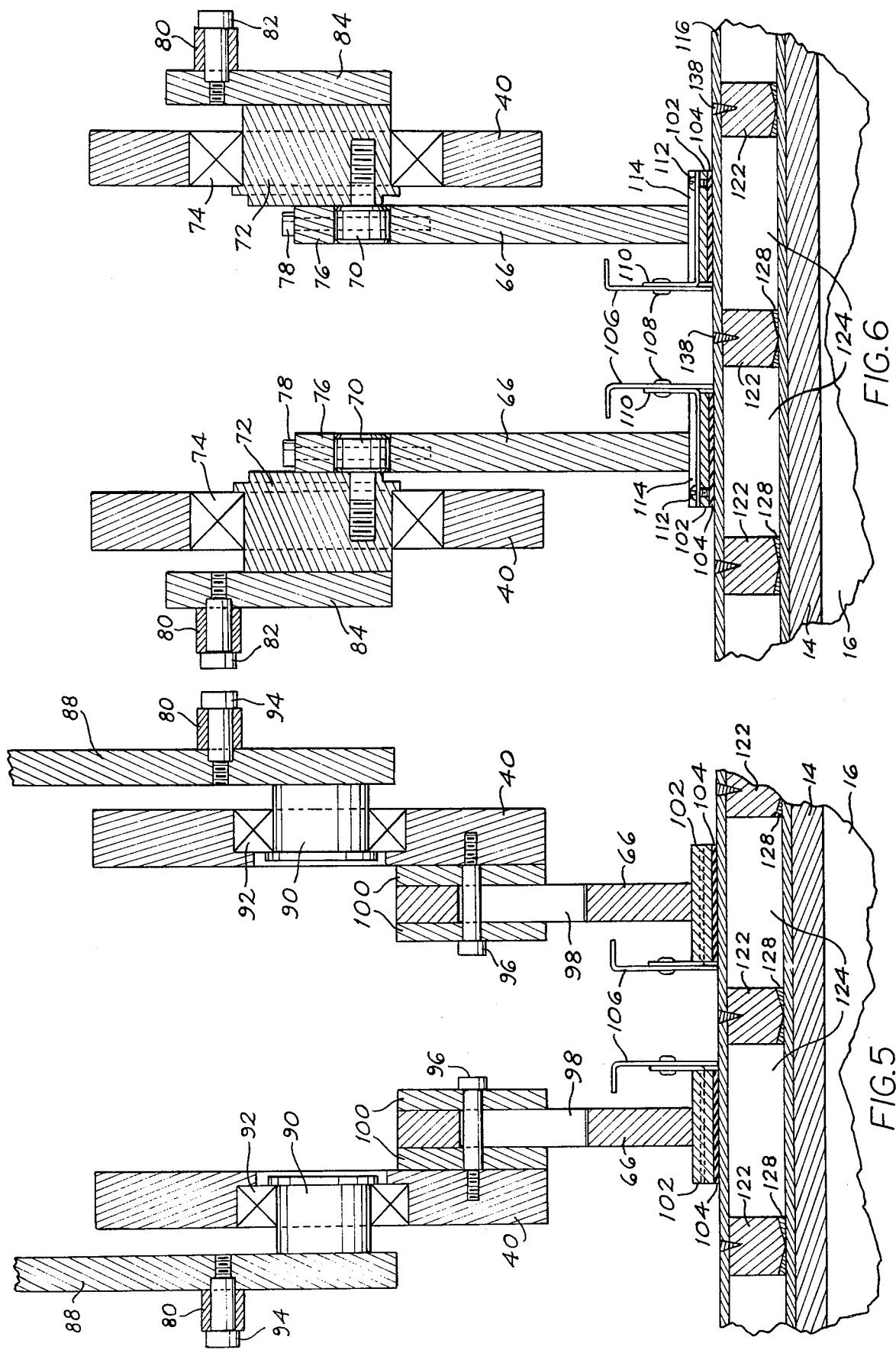

APPARATUS FOR CLAMPING AN ASSEMBLY OF PARTS FOR LASER WELDING

BACKGROUND OF THE INVENTION

This invention relates to laser welding, and more particularly to apparatus for clamping an assembly of parts together preparatory to laser welding.

Laser welding is a well known technique that offers several advantages over conventional arc and other forms of welding. For example, the sharp focusing of a laser beam allows a concentration of energy capable of providing faster welding with less heat introduced into the product, whereby to minimize warping.

To illustrate, in the fabrication of hollow shelves for freeze drying and other processing equipment, laser welding permits use of thinner top and bottom metal plates welded to intermediate spacer bars arranged in the manner to provide a serpentine passageway for the circulation of heating and cooling liquids or gases. Thicker plates conventionally welded require straightening and polishing due to excessive warpage. This costly and time consuming procedure is minimized with laser welding. Furthermore, the use of thinner plates not only decrease the total weight of the shelf but also increases its thermal response. This in turn minimizes the energy and time required to heat or cool the shelf and the product supported on the shelf.

Applicant is unaware of any prior art apparatus for holding an assembly of parts together in preparation for laser welding.

SUMMARY OF THE INVENTION

In its basic concept, the apparatus of this invention provides for releasably clamping together an assembly of parts between an underlying base support and an overlying adjustable clamp mechanism mounted on a carriage movable relative to the base support, preliminary to securing the parts together by laser welding.

It is the principle objective of this invention to provide apparatus for clamping an assembly of parts together for laser welding.

Another object of this invention is to provide apparatus of the class described which accommodates the clamping of parts assemblies of various shapes and sizes.

Still another object of this invention is the provision of apparatus of the class described which enables the laser welding of an assembly of parts with precision, speed and facility and with minimum energy requirement.

A further object of this invention is to provide apparatus of the class described the operation of which may be computerized to provide precise positioning of parts relative to a laser welder.

A specific object of this invention is the provision of apparatus of the class described for making hollow shelves for processing equipment, which shelves are made of metal plates that are thinner than required heretofore and which require minimal subsequent straightening or polishing the shelves being characterized by affording faster heating and cooling with minimum energy requirement.

A still further object of this invention is the provision of apparatus of the class described which is of simplified construction for economical manufacture, maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 1 is a fragmentary, foreshortened view in side elevation of apparatus embodying the features of this invention.

FIG. 2 is a fragmentary, foreshortened plan view as viewed from the top in FIG. 1.

FIG. 3 is a fragmentary end elevation as viewed from the left in FIG. 1.

FIG. 4 is a fragmentary, foreshortened sectional view taken on the line 4—4 in FIG. 2.

FIG. 5 is a fragmentary vertical section taken on the line 5—5 in FIG. 1.

FIG. 6 is a fragmentary vertical section taken on the line 6—6 in FIG. 1.

DESCRIPTION OF THE PREFERRED EMBODIMENT

Figure 11:
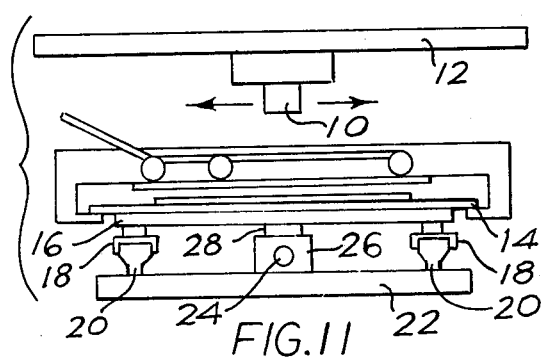
FIG. 11 is a side elevation showing in schematic form the apparatus of this invention in cooperative association with laser welding equipment.

Referring first to FIG. 11 of the drawings, there is shown a laser welder 10 mounted for movement along a elongated supporting track 12 above a work support table 14. The table is mounted on a reinforcing frame 16 to which are secured depending roller guides 18 arranged for rolling engagement on laterally spaced rails 20. The rails project upward from a base frame 22 resting upon a floor. An elongated drive screw 24 is mounted rotatably at its opposite ends in end bearings 26 on the base frame. The drive screw extends through threaded bosses 28 depending from the table frame. A drive motor (not shown) connected to the drive screw rotates the latter for moving the table on a line perpendicular to the movement of the laser welder 10 along the track 12.

Figure 7:
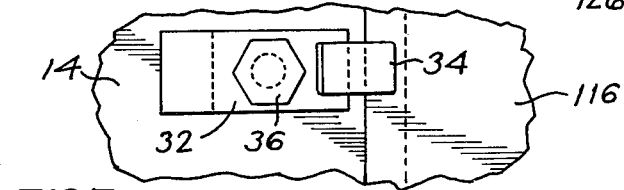
FIG. 7 is a fragmentary plan view of a clamp for securing a parts assembly to the base component of the apparatus.
Figure 8:
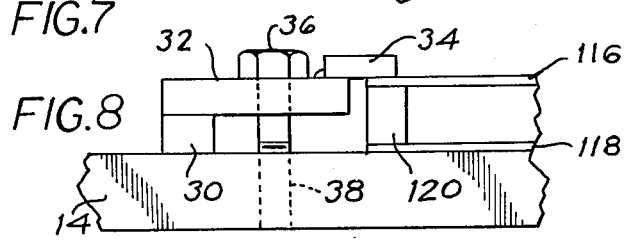
FIG. 8 is a fragmentary side elevation as viewed from the bottom of FIG. 7.

In FIGS. 7 and 8 there is shown an assembly of parts to be welded together, the assembly being supported on the table and secured at intervals about its periphery by clamps. Each clamp has a foot section 30 which supports an intermediate arm section 32 terminating in a clamp finger 34 arranged to overlap the assembly to be welded. A threaded bolt 36 extends through a hole in the arm section for threaded reception in a selected threaded opening 38 in the table for clamping the assembly between the table and finger.

Many such threaded openings are provided in the table, and they are arranged in a pattern designed to accommodate a wide range of dimensions and shapes of parts assemblies to be clamped to the table in proper orientation with respect to the movements of the laser welder and the table. For example, when the parts assembly is rectangular or square, as in the illustrated shelf, welding is to be done along lines extending parallel to some of the side edges. Accordingly, those side edges are aligned parallel to the direction of laser movement along the supporting track.

Clamp mechanism is provided for pressing the internal components of the parts assembly together for welding. The clamp mechanism includes a hollow framework carriage made up of a pair of elongated side plates 40 spaced apart laterally by end plates 42. Bolts 44 are extended through vertically elongated slots 46 in the side plates into threaded engagement with threaded openings in the end plates. This arrangement allows a limited degree of vertical movement of the side plates relative to the end plates. This vertical adjustment is afforded by an adjustment screw 48 which extends through a threaded opening in a support bar 50 which extends across and is secure to the side plates by bolts 52. A stop lug 54 projects outward from the end plate for abutment by the adjustment screw. Thus, rotation of the screw allows the side plates to move vertically relative to the end plates. A lock nut 56 on the screw secures the latter in adjusted position.

The end plates 42 extended downward beyond the side plates and mount rollers 58 adjacent their lower ends for rolling support on the peripheral overhang portion of the table 14. A clamp bar 60 is secured removably to the bottom of each end plate, as by bolts 62, and it extends inward for engaging the underside of the table opposite the rollers 58. The clamp bar supports spaced rollers 64 arranged for rolling engagement with the peripheral edge of the table.

The side plates 40 support inwardly thereof for vertical movement relative thereto, a pair of spaced apart clamp plates 66. This support of the clamp plates is provided by longitudinally spaced cam rollers 70 each secured eccentrically to a circular cam drive roll 72. Each drive roll is mounted for rotation in a bearing 74 supported by the associated side plate. Each cam roller 70 is captured between the upper edge of the clamp plate 40 and an overlying U-shaped cam roll cap 76 secured to the clamp plate by screws 78.

Simultaneous rotation of all of the cam drive rolls is afforded by a common drive linkage comprised of a pair of elongated drive links 80 each connected pivotally by a pivot 82 to a lever 84 secured to each cam drive roll mounted in the same side plate. The drive links extend along the outer sides of the plates 40 and are connected together by a transverse handle 86 extending between a pair of handle levers 88. Each of these levers is secured to a pivot 90 supported in a bearing 92 in the associated side plate 40. The handle levers 88 are connected to the drive links 80 by pivots 94.

Thus, by pivoting the handle levers 88 about their pivots 90 in the clockwise direction of FIG. 1 the clamp plates 66 are raised vertically relative to the side plates 40.

Each clamp plate is coupled to its side plate adjacent its opposite ends by spaced guide screws 96 extended through vertical slots 98 in the clamp plate and holes in associated guide bars 100. The screws are secured in threaded holes in the associated side plate.

The bottom ends of the clamp plates are fitted with elongated foot pads each preferably comprised of an elongated bar 102 secured to the underside of the clamp plate, and an elongated strip of rubber 104 or other resilient material capable of uniformly transferring pressure without marring the confronting surface of a component of a parts assembly to be welded together.

Weld flash guards 106 preferably are provided to prevent stray weld sparks from burning the rubber strips 104 and collecting on the adjacent surfaces of the foot pad bars 102 and clamp plates. As illustrated, each guard is formed of an elongated strip of metal, for example phospher bronze, secured as by welding, bolting or by the rivets 108 illustrated, to a plurality of longitudinally spaced brackets 110. The brackets are secured, as by screws 112, in transverse notches 114 formed at longitudinally spaced intervals along the foot pad bar. The guard extends upward from adjacent the rubber strip and is bent inward toward the associated clamp plate.

To illustrate the operation of the apparatus described hereinbefore, the drawings show an assembly of components making up a hollow shelf for use in freeze drying or other processing equipment. The shelf includes a top plate 116, a bottom plate 118, a plurality of peripheral spacer bars 120 which space the top and bottom plates apart vertically, and a plurality of intermediate spacer bars 122. These latter bars not only serve to space the top and bottom plates apart and provide structural support for the top plate, they also are disposed to form a serpentine passageway 124 for the circulation of a heating or cooling liquid or other suitable fluid between inlet and outlet openings (now shown).

In the embodiment of FIGS. 5 and 6, the peripheral and intermediate spacer bars are first laser welded to the bottom plate before the top plate is installed. This is accomplished by depositing the bottom plate 118 on the table 14 and orienting two of its side edges parallel to the direction of movement of the laser welder 10 along its supporting track 12. Two of the peripheral bars 120 then are deposited of the bottom plate adjacent the edges parallel to the movement of the laser welder. The clamp mechanism then is moved laterally to position one of the foot pads above one of the two positioned peripheral bars. This is achieved by first rotating the handle levers 88 clockwise (FIG. 1) to elevate the foot pads above the level of the peripheral bars. If necessary, the bolts 44 may be loosened and the adjustment screw 48 operated to raise the side plates 40 and clamp plates 66 as required to elevate the foot pads above the peripheral bars.

The clamp assembly carriage then is rolled along the table, on the rollers 58, until the appropriate foot pad is positioned above the selected peripheral bar. The handle is then rotated counterclockwise to lower the operative foot pad into pressure contact with the upper surface of the peripheral bar. This downward pressure of the foot pad causes the clamp plate and carriage end plates to move upward until the clamp bars 60 engage under the table 14. The peripheral bar thus is pressed firmly against the bottom plate.

The laser welder then is oriented, together with an associated mirror, to direct a laser beam laterally inward at a shallow angle relative to horizontal, to the interface between the peripheral bar 120 and the bottom plate 118. The laser welding assembly then is moved along and parallel to the length of the peripheral bar to produce the weld 126 shown in FIG. 10.

Alternatively, the table 14 may be moved by rotation of the drive screw 24, to move the clamped assembly of the peripheral bar and bottom plate relative to the laser beam, to produce the same weld 126.

The opposite, parallel peripheral bar then is welded to the bottom plate in the same manner, by reorienting the laser welder assembly, as will be understood. The bottom plate then is reoriented on the table, by rotating it 90° from the previous position, to dispose the other pair of parallel sides of the bottom plate parallel to the direction of movement of the laser welder and the movement of the table on the rails. The remaining two peripheral bars then are positioned adjacent said side edges and welded to the bottom plate in the manner just described.

The plurality of intermediate bars 122 then are arranged on the bottom plate in laterally spaced apart relationship extending parallel to the direction of movement of the laser welder and table. Adjacent intermediate bars are placed in abutment with opposed peripheral bars 120 to provide the serpentine passageway 124 previously mentioned. Each bar 122 is pressed against the bottom plate by means of one of the foot pads of the clamp assembly, in the manner described in connection with the peripheral bars, and welded in position by the laser welder operation also described. However, whereas a continuous weld is required for the peripheral bars, the intermediate bars may be secured to the bottom plate by a plurality of welds 128 spaced apart at intervals along the bars at each side of the latter.

Figure 9:
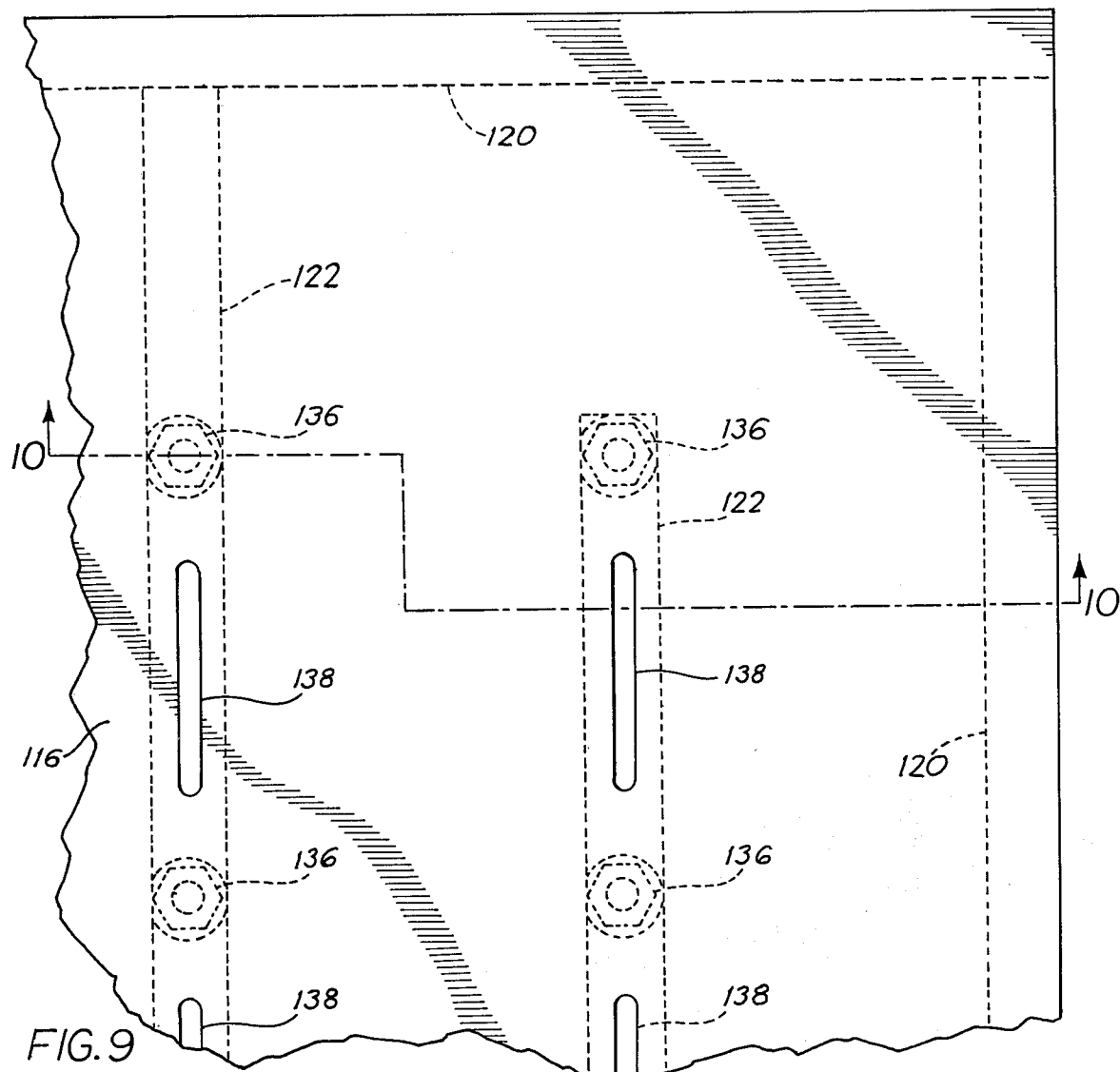
FIG. 9 is a fragmentary plan view of a hollow shelf showing the manner in which the parts are secured together by laser welding using the apparatus of this invention.
Figure 10:
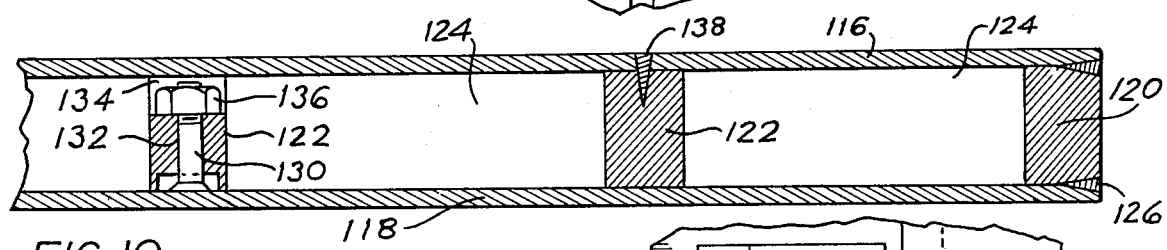
FIG. 10 is a fragmentary sectional view taken on the line 10—10 in FIG. 9.

In the embodiment illustrated in FIGS. 9 and 10, the intermediate spacer bars 122 are secured to the bottom plate 118 by spaced bolts 130 welded to the bottom plate and extending upward through correspondingly spaced openings 132 in the intermediate spacer bars. A countersunk enlarged upper portion 134 of each opening freely receives a securing nut 136 for the bolt threads, whereby to tighten the spacer bar securely against the bottom plate.

The top plate 116 now is laid over the spacer bars welded to the bottom plate and the assembly then is secured to the table by means of the peripheral clamps (FIGS. 7 and 8). With the foot pads 104 elevated above the top plate, by clockwise rotation of the handle 86 from the position illustrated in FIG. 1, the clamp assembly carriage is moved along the table on the rollers 58 in the direction perpendicular to the longitudinal direction of the intermediate spacer bars 122 until the spaced foot pads are located at opposite sides of a spacer bar to be welded. This position is illustrated in FIGS. 5 and 6 of the drawings. The handle is then rotated counterclockwise to the position of FIG. 1, thereby lowering the foot pads into pressure contact with the top plate and pressing the latter firmly against the underlying spacer bar. The laser welder then is activated and moved along a line centered over the spacer bar. Although the laser welder may produce a continuous weld along the full length of the spacer bar, it may be controlled to provide a plurality of spaced apart welds 138, for example intermediate the bolts 130 in the embodiment of FIGS. 9 and 10.

Alternatively, the laser welder 10 may be retained in fixed position and the table 14 moved along the rails 20, as previously described.

It will be recognized by those skilled in the art that the movements of the laser welder, table and clamp assembly carriage relative to each other, may be accomplished manually under the control of an operator, or may be connected in well known manner to an appropriately programmed computer for the precise positioning of welds.

It will also be apparent to those skilled in the art the various changes may be made in the size, shape, type, number and arrangement of parts described hereinbefore without departing from the spirit of this invention and the scope of the appended claims:

Having now described my invention and the manner in which it may be used, I claim:

1. Apparatus for clamping an assembly of parts for laser welding comprising:
   (a) a table for supporting an assembly of parts,
   (b) clamp means mounted on the table for selective movement substantially parallel to and perpendicular to the plane of the table for releasably clamping between the table and clamp means selected portions of an assembly of an assembly of parts to be welded, and
   (c) laser welding means mounted adjacent the table for movement of its laser beam substantially normal to the direction of movement of the clamp means.

2. The apparatus of claim 1 including means mounting the table for movement substantially normal to the direction of movement of the laser welding means.

3. The apparatus of claim 1 including support means above the table for supporting the laser welding means for movement substantially normal to the direction of movement of the clamp means.

4. Apparatus for clamping an assembly of parts for laser welding comprising:
   (a) a table for supporting an assembly of parts, and
   (b) clamp means on the table for movement relative thereto for releasably clamping between the table and clamp means selected portions of an assembly of parts to be welded, the clamp means comprising:
      (1) an elongated centrally open carriage having laterally spaced side walls and longitudinally spaced end walls, the carriage having open top and bottom sides for the passage of a laser welding beam,
      (2) table engaging means on the end walls having vertically spaced apart members arranged to receive marginal portions of the table between them for limiting vertical displacement of the clamp means relative to the table,
      (3) an elongated clamp member mounted adjacent each side wall for vertical movement between assembly clamping and unclamping poition,
      (4) the bottom ends of the clamp members being arranged to releasably engaged components of an assembly of parts on the table and, upon movement of the clamp members toward clamping position, to clamp the assembly of parts between the clamp members and table.

5. The apparatus of claim 4 including adjustable connecting means interengaging the side and end walls of the carriage for adjusting the side walls vertically relative to the end walls, for varying the vertical spacing between the table and the bottom ends of the clamp members.

6. The apparatus of claim 4 including adjusting means interengaging the side walls and clamp members for moving the clamp members vertically between said clamping and unclamping positions.

7. The apparatus of claim 6 wherein the adjusting means comprise a plurality of eccentric rotary cam members interengaging the side walls and clamp members, and lever means engaging the cam members for rotating them for moving the clamp members between said clamping and unclamping positions.

8. The apparatus of claim 2 including:

(a) means mounting the table for movement substantially normal to the direction of movement of the clamp means, (b) laser welding means positioned adjacent the table for directing a laser welding beam toward an assembly of parts on the table, and (c) support means above the table for supporting the laser welding means for movement substantially normal to the direction of movement of the clamp means.

9. Apparatus for clamping an assembly of parts for laser welding comprising:

(a) a table for supporting an assembly of parts, and (b) clamp means on the table for movement relative thereto for releasably clamping between the table and clamp means selected portions of an assembly of parts to be welded, the clamp means comprising:

(1) an elongated centrally open carriage having laterally spaced side walls and longitudinally spaced end walls, the carriage having open top and bottom sides for the passage of a laser welding beam, (2) table engaging means on the end walls having vertically spaced apart members arranged to receive marginal portions of the table between them for limiting vertical displacement of the clamp means relative to the table, (3) an elongated clamp member mounted adjacent each side wall for vertical movement between assembly clamping and unclamping positions, (4) the bottom ends of the clamp members being arranged to releasably engage components of an assembly of parts on the table and, upon movement of the clamp members toward clamping position, to clamp the assembly of parts between the clamp members and table, (5) adjustable connecting means interengaging the side and end walls of the carriage for adjusting the side wall vertically relative to the end walls for varying the vertical spacing between the table and bottom ends of the clamp members, and (6) adjusting means interengaging the side walls and clamp members for moving the clamp members vertically between said clamping and unclamping positions, (7) the adjusting means comprise a plurality of eccentric rotary cam members interengaging the side walls and clamp members, and lever means engaging the cam members for rotating them for moving the clamp members between said clamping and unclamping positions.

10. The method of making a hollow shelf for the circulation of heat exchange fluid, comprising:

(a) arranging on a bottom plate of heat conductive metal a plurality of peripheral metal spacer bars to form a peripheral wall about the plate, (b) laser welding the peripheral bars to the bottom plate, (c) arranging on the bottom plate a plurality of spaced apart internal metal spacer bars extending substantially parallel to each other and with alternate bars abutting the peripheral bars at opposite sides of the bottom plate, whereby to form a serpentine passageway defined by the peripheral and internal bars, (d) securing the internal bars to the bottom plate, (e) arranging a top plate of heat conductive metal over the sub-assembly of bottom plate and peripheral and internal bars, (f) laser welding the top plate to the peripheral bars, and (g) laser welding the top plate to the internal bars by directing a laser beam through the top plate.

11. A hollow shelf for circulating a heat exchange fluid therethrough, comprising:

(a) top and bottom plates of heat conductive metal, (b) a plurality of peripheral metal spacer bars interposed between the top and bottom plates about the periphery thereof and laser welded thereto, (c) a plurality of internal metal spacer bars interposed between the top and bottom plates inwardly of the peripheral bars, the internal bars extending substantially parallel to each other with alternate bars abutting the peripheral bars at opposite sides of the plates, whereby to form a serpentine passageway defined by the peripheral and internal bars, (d) the internal bars being secured to the bottom plate and being laser welded to the top plate by directing a laser beam through the top plate.

* * * * *

UNITED STATES PATENT AND TRADEMARK OFFICE
CERTIFICATE OF CORRECTION

PATENT NO. : 4,461,946
DATED : 24 July 1984
INVENTOR(S) : Eric L. Kratschmer

It is certified that error appears in the above-identified patent and that said Letters Patent are hereby corrected as shown below:

Column 6, line 68, "8. The apparatus of claim 2 including:"

should read --9. The apparatus of claim 8 including:--

Column 7, line 11, "9" should read --8--

Signed and Sealed this

First Day of January 1985

[SEAL]

Attest:

GERALD J. MOSSINGHOFF

Attesting Officer          Commissioner of Patents and Trademarks